United States Patent Office 2,776,279
Patented Jan. 1, 1957

2,776,279

BENZIMIDAZOLE-PENICILLIN SALT

Heinrich Mückter and Erich Jansen, Stolberg, Germany, assignors to Chemie Gruenenthal G. m. b. H., Stolberg, Germany, a corporation of Germany No Drawing. Application January 14, 1954, Serial No. 404,131

2 Claims. (Cl. 260—239.1)

This invention relates to novel salt-like penicillin compounds and the production thereof.

Patients treated with penicillin frequently show allergic symptoms. This happens also when penicillin is replaced by salt-like compounds of penicillin with organic bases, such for example as Novocain.

The present invention provides novel penicillin compounds which obviate the above mentioned undesired effects, namely a salt-like penicillin compound derived from a penicillin and 1-p-chlorbenzyl-2-N-pyrrolidylmethyl-benzimidazole.

According to the invention the novel compounds are made by reacting penicillin, preferably in the form of a metal salt such as an alkali metal salt, in aqueous solution or in solution in an organic solvent, with the benzimidazole compound, preferably in the form of a salt thereof, for example in the form of a hydrogen halide salt, whereupon the desired compound separates as a sparingly soluble precipitate. The new compounds can be produced from various qualities of penicillin, for example from amorphous or crystalline penicillin.

As compared to administration of penicillin and the benzimidazole compound separately, administration of the new compounds of the invention has the advantage that the two substances produce their specific actions without undesirable delay and that the new compound gives a very desirable prolonged penicillin effect.

The new compounds are preferably employed in the form of suspensions, for example in isotonic solutions.

*Example 1*

An aqueous solution of a penicillin G salt, cooled to 1–5° C., is treated with the equivalent quantity of a similarly cooled aqueous solution of 1-p-chlorbenzyl-2-pyrrolidylmethyl - benzimidazole hydrochloride. The emulsion thus produced forms a crystalline precipitate on standing for a long time in the ice-chest. The white crystalline precipitate, after trituration with cold water, is filtered off and washed with water. The salt thus obtained is then dried in a vacuum desiccator. The melting point is determined by dipping into a bath at 105° C. and raising the temperature at approximately 5° C. per minute, giving a melting point of 147–148.7° C. with foaming.

*Example 2*

The same compound can also be made as follows:

A cold chloroform solution of free penicillin G is treated with an equivalent quantity of 1-p-chlorbenzyl-2-pyrrolidylmethyl-benzimidazole, likewise dissolved in chloroform. At first no precipitate is formed. The chloroform solution is concentrated at low temperature and then diluted with hexane which produces turbidity. The salt first separates in a viscous form and becomes solid on prolonged trituration on standing. The melting point is 144–146° C. with foaming.

What we claim is:

1. The new substantially water insoluble penicillin salt of 1-p-chloro benzyl-2-N-pyrrolidyl methyl benzimidazole, said salt, on administration, exhibiting prolonged penicillin action and being readily tolerated.

2. The new substantially water insoluble penicillin G salt of 1-p-chloro benzyl-2-N-pyrrolidyl methyl benzimidazole, said salt, on administration, exhibiting prolonged penicillin action and being readily tolerated.

References Cited in the file of this patent

UNITED STATES PATENTS 2,683,711    Short et al. _____ July 13, 1954

FOREIGN PATENTS 1,084,467    France _____ July 7, 1954

OTHER REFERENCES

Brett et al.: "Arzneimittel Forchung," vol. 1, August 1951, pp. 215–217.